United States Patent
Uchino et al.

(10) Patent No.: US 10,397,885 B2
(45) Date of Patent: Aug. 27, 2019

(54) TERMINAL THAT TRANSMITS REPORTING INFORMATION AND COMMUNICATION CONTROL METHOD OF TRANSMITTING REPORTING INFORMATION IN MOBILE COMMUNICATION SYSTEM

(71) Applicant: NTT DOCOMO, INC., Tokyo (JP)

(72) Inventors: Tooru Uchino, Tokyo (JP); Kunihiko Teshima, Tokyo (JP); Kazuki Takeda, Tokyo (JP); Hideaki Takahashi, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 29 days.

(21) Appl. No.: 15/541,829

(22) PCT Filed: Feb. 17, 2016

(86) PCT No.: PCT/JP2016/054588
§ 371 (c)(1),
(2) Date: Jul. 6, 2017

(87) PCT Pub. No.: WO2016/133126
PCT Pub. Date: Aug. 25, 2016

(65) Prior Publication Data
US 2018/0167896 A1 Jun. 14, 2018

(30) Foreign Application Priority Data
Feb. 20, 2015 (JP) .................. 2015-032255

(51) Int. Cl.
*H04W 16/32* (2009.01)
*H04W 24/10* (2009.01)
(Continued)

(52) U.S. Cl.
CPC ......... *H04W 52/365* (2013.01); *H04W 16/32* (2013.01); *H04W 24/10* (2013.01);
(Continued)

(58) Field of Classification Search
CPC ..... H04W 52/36; H04W 16/32; H04W 24/10; H04W 28/02; H04W 72/08; H04W 72/14;
(Continued)

(56) References Cited

U.S. PATENT DOCUMENTS

2012/0236776 A1* 9/2012 Zhang ................. H04W 48/12
370/312
2013/0336228 A1* 12/2013 Zhao ..................... H04W 24/10
370/328
(Continued)

FOREIGN PATENT DOCUMENTS

WO 2012168843 A1 12/2012

OTHER PUBLICATIONS

International Search Report issued in PCT/JP2016/054588 dated May 10, 2016 (3 pages).
(Continued)

*Primary Examiner* — Charles C Jiang
*Assistant Examiner* — Kyaw Z Soe
(74) *Attorney, Agent, or Firm* — Osha Liang LLP

(57) ABSTRACT

A terminal is provided. The terminal communicates with a base station in a mobile communication system which supports carrier aggregation provided by a first cell and a second cell which uses a subframe whose time interval is shorter than a time interval of a subframe of the first cell. The terminal includes a calculation unit configured to calculate reporting information to be reported to the base station based on a specific subframe, of a plurality of subframes of the second cell corresponding to a predetermined subframe of the first cell, shared by the base station and the terminal; and a reporting unit configured to report the reporting information calculated by the calculation unit to the base station.

11 Claims, 16 Drawing Sheets

(51) Int. Cl.
  *H04W 28/02* (2009.01)
  *H04W 52/36* (2009.01)
  *H04W 72/08* (2009.01)
  *H04W 72/12* (2009.01)
  *H04W 72/14* (2009.01)
  *H04W 88/02* (2009.01)
  *H04W 88/06* (2009.01)
  *H04W 88/08* (2009.01)

(52) U.S. Cl.
  CPC ..... *H04W 28/0278* (2013.01); *H04W 72/085* (2013.01); *H04W 72/1284* (2013.01); *H04W 72/14* (2013.01); *H04W 88/02* (2013.01); *H04W 88/06* (2013.01); *H04W 88/08* (2013.01)

(58) Field of Classification Search
  CPC ............. H04W 52/365; H04W 72/085; H04W 28/0278; H04W 72/1284; H04W 88/06; H04W 88/02; H04W 88/08
  See application file for complete search history.

(56) References Cited

U.S. PATENT DOCUMENTS

2014/0185467 A1* 7/2014 Heo ............... H04W 52/54
                                              370/252
2016/0100407 A1* 4/2016 Gaal .............. H04W 72/0453
                                              370/329

OTHER PUBLICATIONS

Written Opinion of the International Searching Authority issued in PCT/JP2016/054588 dated May 10, 2016 (4 pages).
3GPP TS 36.300 V12.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Dec. 2014 (251 pages).
Extended European Search Report issued in the counterpart European Patent Application No. 16752512.0, dated Feb. 2, 2018 (10 pages).
CATT; "Impact of CA on MAC layer"; 3GPP TSG-RAN WG2 #67, R2-094326; Shenzhen, China, Aug. 24-28, 2009 (3 pages).

* cited by examiner

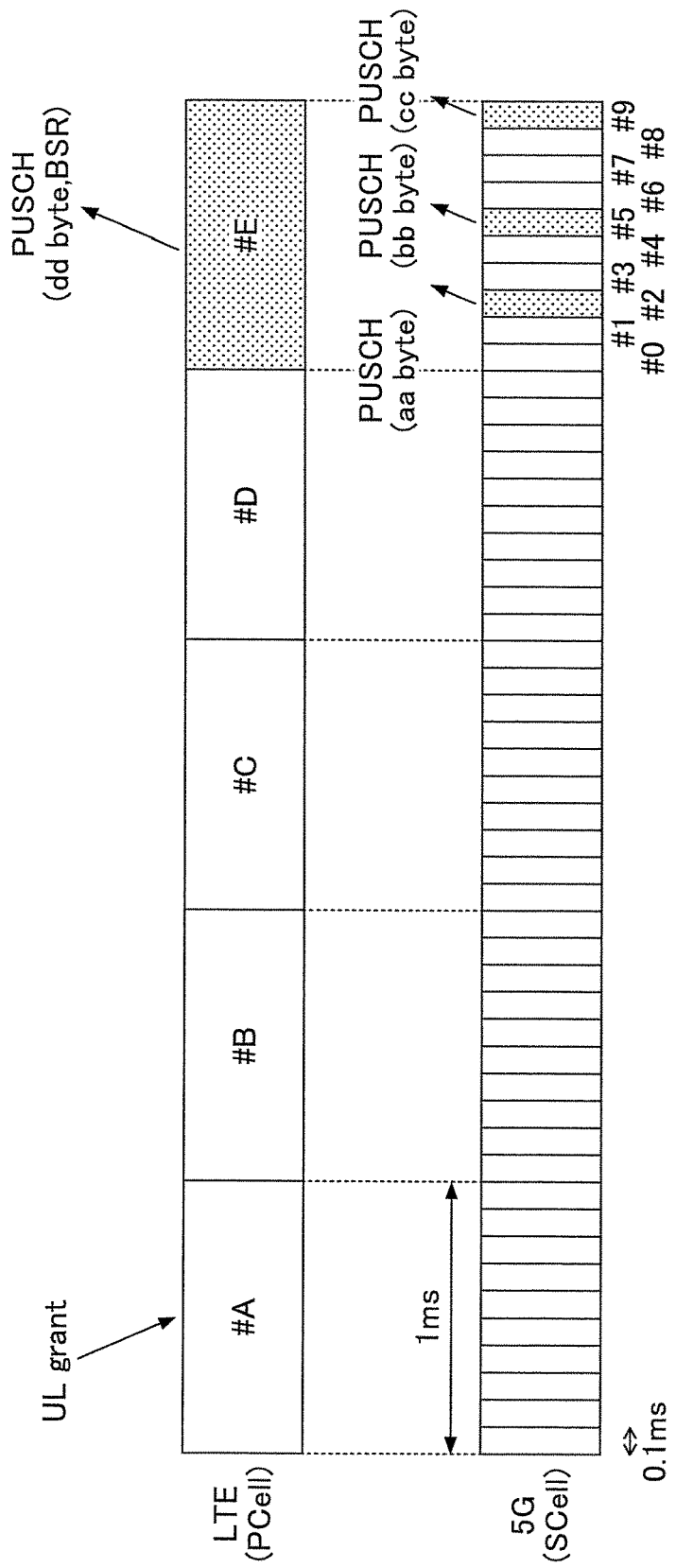

FIG.10B

| LCG ID | Buffer Size | | | | | | | Oct1 |
|---|---|---|---|---|---|---|---|---|
| #0 | #1 | #2 | #3 | #4 | #5 | #6 | #7 | Oct2 |
| #8 | #9 | R | R | R | R | R | R | Oct3 |

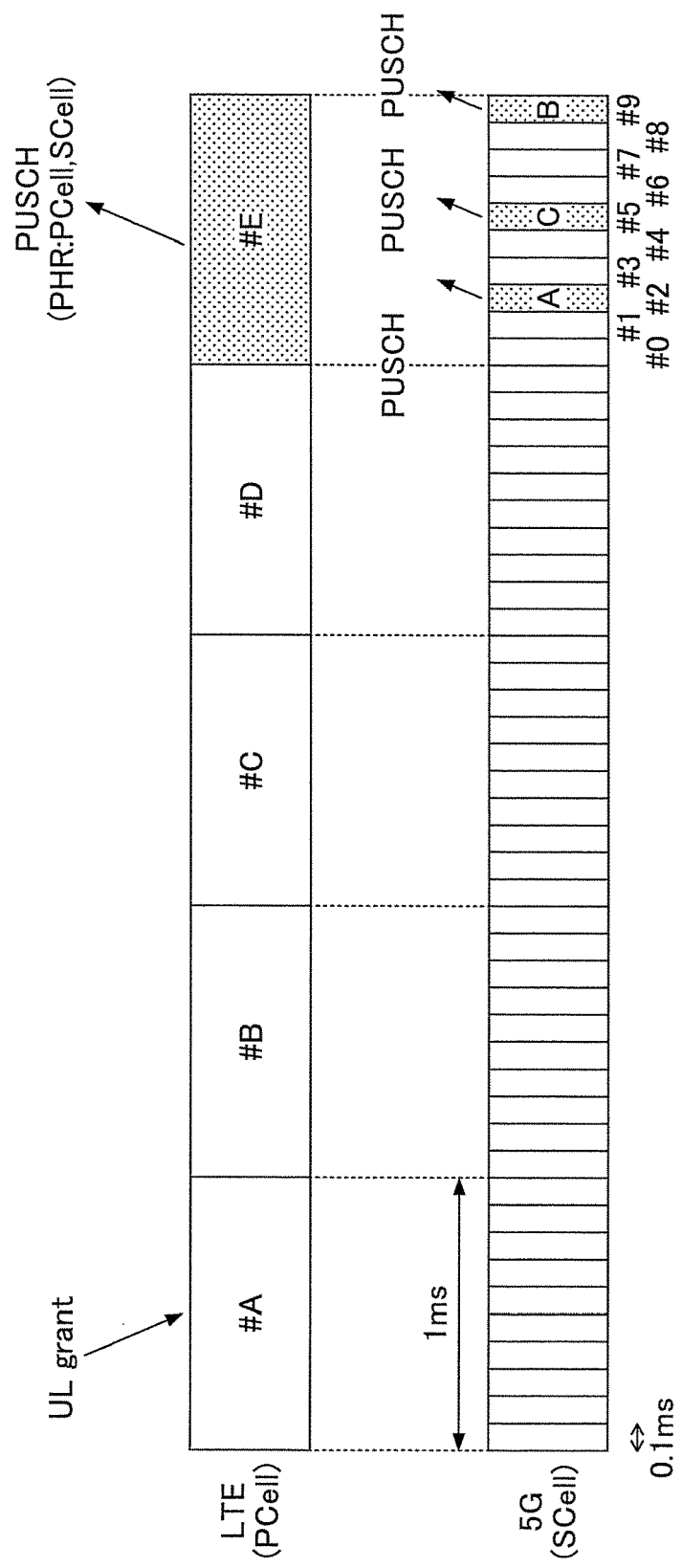

| #0 | #1 | #2 | #3 | #4 | #5 | #6 | #7 | Oct1 |
| #8 | #9 | R | R | R | R | R | R | Oct2 |

FIG.14B

| C$_7$ | C$_6$ | C$_5$ | C$_4$ | C$_3$ | C$_2$ | C$_1$ | R | |
|---|---|---|---|---|---|---|---|---|
| C$_7$ | C$_6$ | C$_5$ | C$_4$ | C$_3$ | C$_2$ | C$_1$ | R | Oct1 |
| P | V | \multicolumn{6}{c|}{PH(Type 2,PCell)} | Oct2 |
| R | R | \multicolumn{6}{c|}{P$_{CMAX,c}$1} | Oct3 |
| P | V | \multicolumn{6}{c|}{PH(Type 1,PCell)} | Oct4 |
| R | R | \multicolumn{6}{c|}{P$_{CMAX,c}$2} | Oct5 |
| P | V | \multicolumn{6}{c|}{PH(Type 1,PCell)} | Oct6 |
| R | R | \multicolumn{6}{c|}{P$_{CMAX,c}$3} | Oct7 |
| #0 | #1 | #2 | #3 | #4 | #5 | #6 | #7 | Oct8 |
| #8 | #9 | R | R | R | R | R | R | Oct9 |

TERMINAL THAT TRANSMITS REPORTING INFORMATION AND COMMUNICATION CONTROL METHOD OF TRANSMITTING REPORTING INFORMATION IN MOBILE COMMUNICATION SYSTEM

BACKGROUND OF THE INVENTION

1. Field of the Invention

The present invention relates to a terminal and a communication control method.

2. Description of the Related Art

Carrier aggregation (CA) is adopted in a long term evolution (LTE) system. In CA, communications are performed by having a predetermined bandwidth as a basic unit (maximum 20MHz), and by using a plurality of carriers simultaneously. By using carrier aggregation (hereinafter, referred to as "CA"), it is possible to use a bandwidth wider than conventional LTE communications, and it is possible to increase communication speed and capacity. A carrier as a basic unit of CA is referred to as a component carrier (CC).

When CA is performed, a primary cell (PCell) that has high reliability for securing connectivity and a secondary cell (SCell) are set for a terminal in a CA configuration. The terminal is first connected to a PCell, and, if necessary, an SCell can be added.

Further, in an LTE system, an operation called scheduling is performed in which radio resources are assigned (allocated) to users (terminals) when performing data transmission and reception between a base station and terminals. The minimum time unit of the scheduling is called transmission time interval (TTI). One TTI is 1 ms. Further, the TTI is also referred to as a subframe. One subframe is 1 ms. (Refer to, for example, NPL 1).

CITATION LIST

Non-Patent Literature

[NPL 1]
3GPP TS36.300 V12.4.0 (2014-12)

SUMMARY OF THE INVENTION

Technical Problem

According to 3rd generation partnership project (3GPP), standardization of the fifth generation radio technology (hereinafter, referred to as "5G") will start from Release 14. In 5G, in order to reduce radio communication delay, it has been investigated to, for example, reduce 1 TTI to 0.1 ms.

Further, as a 5G deployment scenario, a deployment scenario has been investigated in which CA is provided by having an LTE cell as a base and having a 5G cell overlaid.

Here, in LTE, a terminal transmits information including a buffer size (BS) and power headroom (PH) (power margin) of the terminal to a base station in media access control (MAC) layer. Transmitting information of a buffer size of a terminal is referred to as a buffer status report (BSR), and transmitting information of power headroom (power margin) of a terminal is referred to as a power headroom report (PHR).

The buffer size of a terminal indicates how much data to be transmitted in uplink to the base station the terminal has. The base station allocates radio resources in uplink to the terminal based on the buffer size reported by the terminal (scheduling).

The power headroom (power margin) is calculated according to a predetermined calculation formula defined by 3GPP, and indicates how much the terminal can increase transmission power. The base station, for example, determines an uplink modulation method and allocates resource blocks based on the power headroom reported by the terminal.

In LTE, in the case where communications are performed by CA using multiple cells, it is possible for the terminal to report the buffer size of the terminal, power headroom of a PCell and power headroom of an SCell together to the base station via a physical uplink shared channel (PUSCH) of the PCell.

However, as described above, it is expected that TTIs are different between LTE and 5G. Therefore, when CA is performed by having an LTE cell as a PCell and a 5G cell as an SCell, the terminal cannot determine at what timing of multiple subframes of the SCell the terminal should calculate the buffer size of the terminal and the power headroom of the SCell and report the calculation result to the base station.

FIG. 1 is a drawing illustrating a problem. As illustrated in FIG. 1, it is assumed that the PCell is an LTE cell, and the SCell is a 5G cell. Further, it is assumed that the TTI of the 5G cell is 0.1 ms.

First, a UL grant is transmitted from the PCell to the terminal (S1). The UL grant is a signal used for transmitting uplink scheduling information to the terminal. Here, the base station transmits the UL grant to the terminal in order to allocate radio resources used for reporting the buffer size of the terminal and power headroom of the cells to the base station.

Subsequently, the terminal transmits uplink data by using the SCell (S2 through S4). Further, based on the scheduling according to the UL grant, the terminal sets the buffer size of the terminal and the power headroom of the PCell and the SCell in a MAC control element (CE), and transmits the MAC CE to the base station by using a PUSCH of the PCell (S5).

Here, as illustrated in an example of FIG. 1, there are 10 subframes of the SCell in one subframe of the PCell. Further, during 1 ms used for step S5, uplink data transmission is performed by using three subframes of the SCell (S2 through S4).

The terminal reports the power headroom of the SCell to the base station in step S5. However, the number of power headrooms of the SCell which can be set in the MAC CE is one. Therefore, there is a problem for the terminal in that the terminal cannot determine which power headroom, of power headrooms of subframes related to processing steps of S2, S3, and S4, should be reported to the base station as power headroom of the SCell. Further, there is also a problem for the base station in that the base station cannot determine which power headroom, of power headroom of the subframes of the SCell, has been reported, and cannot perform uplink scheduling appropriately.

Similarly, there is a problem for the terminal in that, when reporting the buffer size of the terminal to the base station in step S5, the terminal cannot determine uplink data amount of which processing step, of the processing steps of S2, S3, and S4, should be taken into account for calculating the buffer size. Further, there is also a problem for the base station in that the base station cannot determine the buffer size of the terminal accurately, and may perform useless (excessive) resource allocation in the uplink scheduling.

The present invention has been made in view of the above. An object of the present invention is to provide a technique in which, in carrier aggregation using cells with different subframe time intervals, in the case where information used for controlling communications is transmitted from a terminal to a base station, the information can be transmitted to the base station appropriately.

Solution to Problem

A terminal is provided. The terminal communicates with a base station in a mobile communication system which supports carrier aggregation provided by a first cell and a second cell which uses a subframe whose time interval is less than a time interval of a subframe of the first cell. The terminal includes a calculation unit configured to calculate reporting information to be reported to the base station based on a specific subframe, of a plurality of subframes of the second cell corresponding to a predetermined subframe of the first cell, shared by the base station and the terminal; and a reporting unit configured to report the reporting information calculated by the calculation unit to the base station.

Advantageous Effects of Invention

According to an embodiment, a technique is provided in which, in carrier aggregation using cells with different subframe time intervals, in the case where information used for controlling communications is transmitted from a terminal to a base station, the information can be transmitted to the base station appropriately.

BRIEF DESCRIPTION OF THE DRAWINGS

FIG. 8A is a drawing illustrating processing steps related to reporting a buffer size (No. 2).
FIG. 10B is a drawing illustrating processing steps related to reporting a buffer size (No. 3).
FIG. 11 is a drawing illustrating processing steps related to a power headroom report (No. 1).

FIG. 14B is a drawing illustrating processing steps related to a power headroom report (No. 3).

DETAILED DESCRIPTION OF THE PREFERRED EMBODIMENTS

Figure 1:
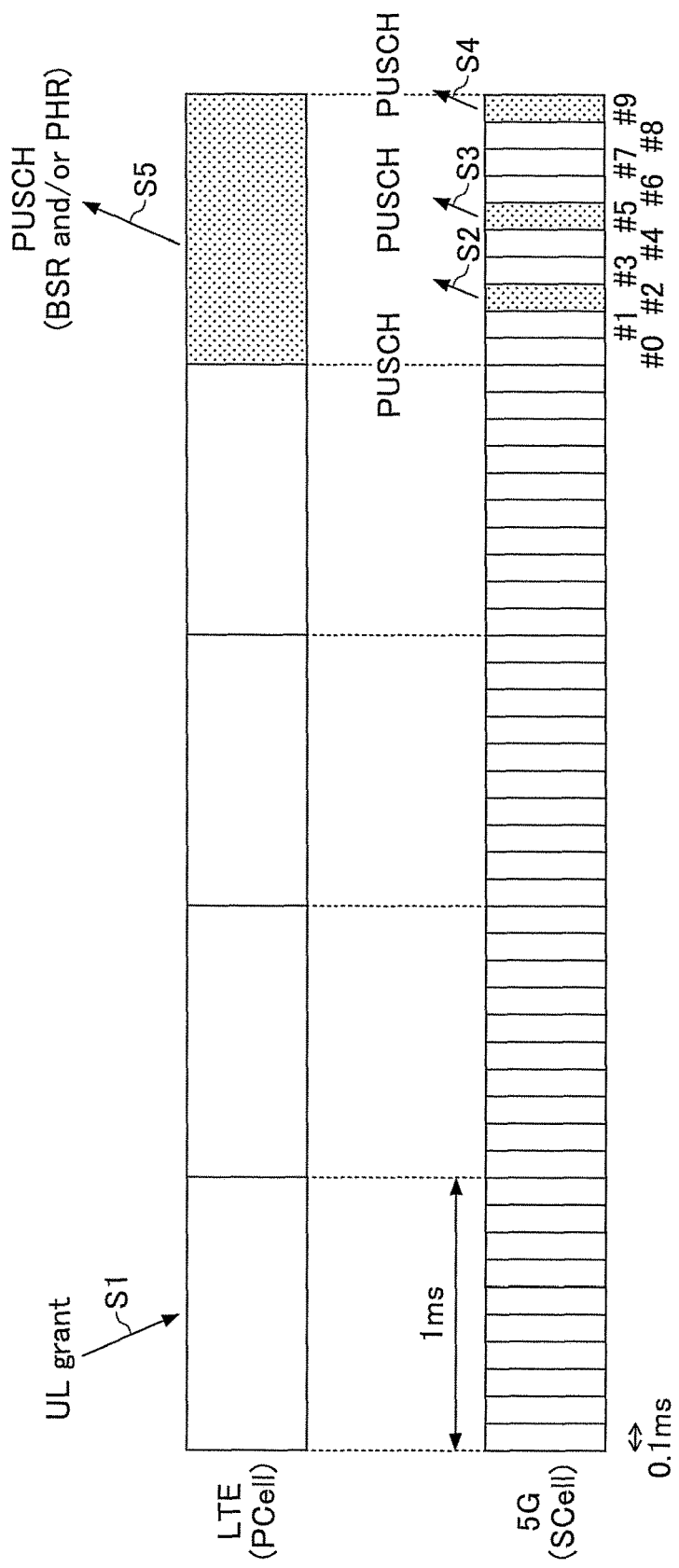
FIG. 1 is a drawing illustrating a problem.

In the following, referring to the drawings, embodiments of the present invention will be described. It should be noted that the embodiments described below are merely examples and the embodiments to which the present invention is applied are not limited to the following embodiments. In an embodiment, a target is a mobile communication system of LTE and 5G. However, an embodiment is not limited to LTE and 5G, and can be applied to other mobile communication systems. Further, in an embodiment, it is assumed as a prerequisite in the description that a carrier aggregation technology is introduced in the mobile communication system. The embodiment is not limited to it. Further, in an embodiment, it is assumed as a prerequisite in the description that information transmitted from a terminal to a base station is a buffer size of the terminal or power headroom of the cells. Embodiments are not limited to it.

Further, in an embodiment, descriptions are provided by assuming that the TTI of 5G cell is 0.1 ms. Embodiments are not limited to it. A mobile communication system according to an embodiment can be applied to any communication method as long as the TTI of the SCell is less than the TTI of the PCell.

It should be noted that, in the following description, a buffer size of a terminal may be simply referred to as a "buffer size".

<Overall System Configuration>

Figure 2:
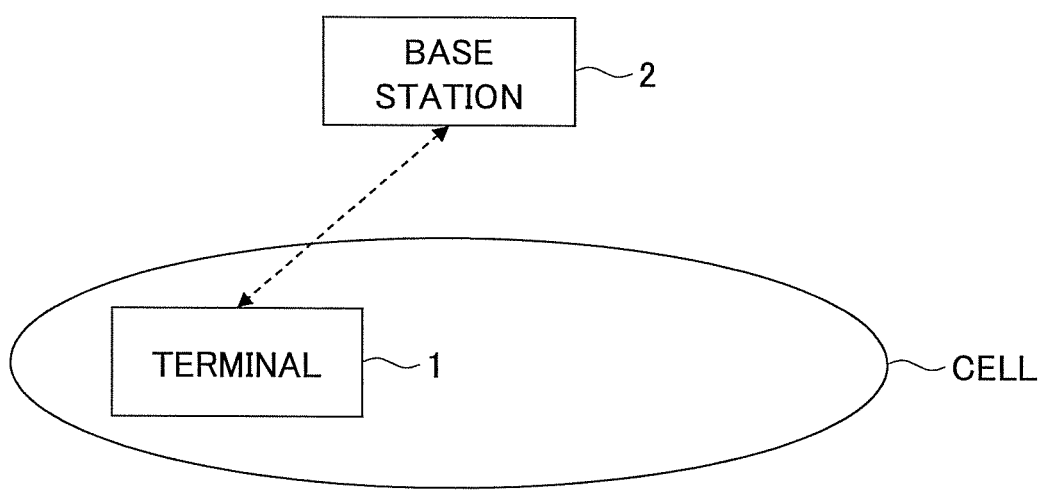
FIG. 2 is a drawing illustrating a structure of a mobile communication system according to an embodiment.

FIG. 2 is a drawing illustrating a structure of a mobile communication system according to an embodiment. As illustrated in FIG. 2, a mobile communication system according to an embodiment includes a terminal 1 and a base station 2, and CA communications can be performed between the terminal 1 and the base station 2.

Further, although in an example of FIG. 2, a single cell is indicated for the sake of convenience, when CA configuration is set, multiple cells exist. Further, for example, RRE, located away from the base station 2, connected to the base station 2 via an optical fiber, etc., may be included.

The base station 2 performs communications with the terminal 1 via radio. The base station 2 includes hardware resources such as a CPU including a processor, a memory device including a ROM, a RAM, a flash memory, etc., an antenna used for communications with the terminal 1, etc., a communication interface device for communicating with a neighboring base station 2, a core network, etc. Functions and processes of the base station 2 may be realized by having the processor processing data or executing programs stored in the memory device. However, the hardware configuration of the base station 2 is not limited to the above, and the base station 2 may have any other appropriate hardware configuration.

The terminal 1 has a function for communicating with the base station 2, the core network, etc., via radio. The terminal 1 may be, for example, a mobile phone, a smartphone, a tablet, a mobile router, a wearable terminal, etc. The terminal 1 may be any apparatus as long as it has a communication function. The terminal 1 includes hardware resources such as a CPU including a processor, a memory device including a ROM, a RAM, a flash memory, etc., an antenna used for communicating with the base station 2, a radio frequency (RF) device, etc. Functions and processes of the terminal 1 may be realized by having the processor processing data or executing programs stored in the memory device. However, the hardware configuration of the terminal 1 is not limited to the above, and the terminal 1 may have any other appropriate hardware configuration.

<Functional Configuration>
(Terminal)

Figure 3:
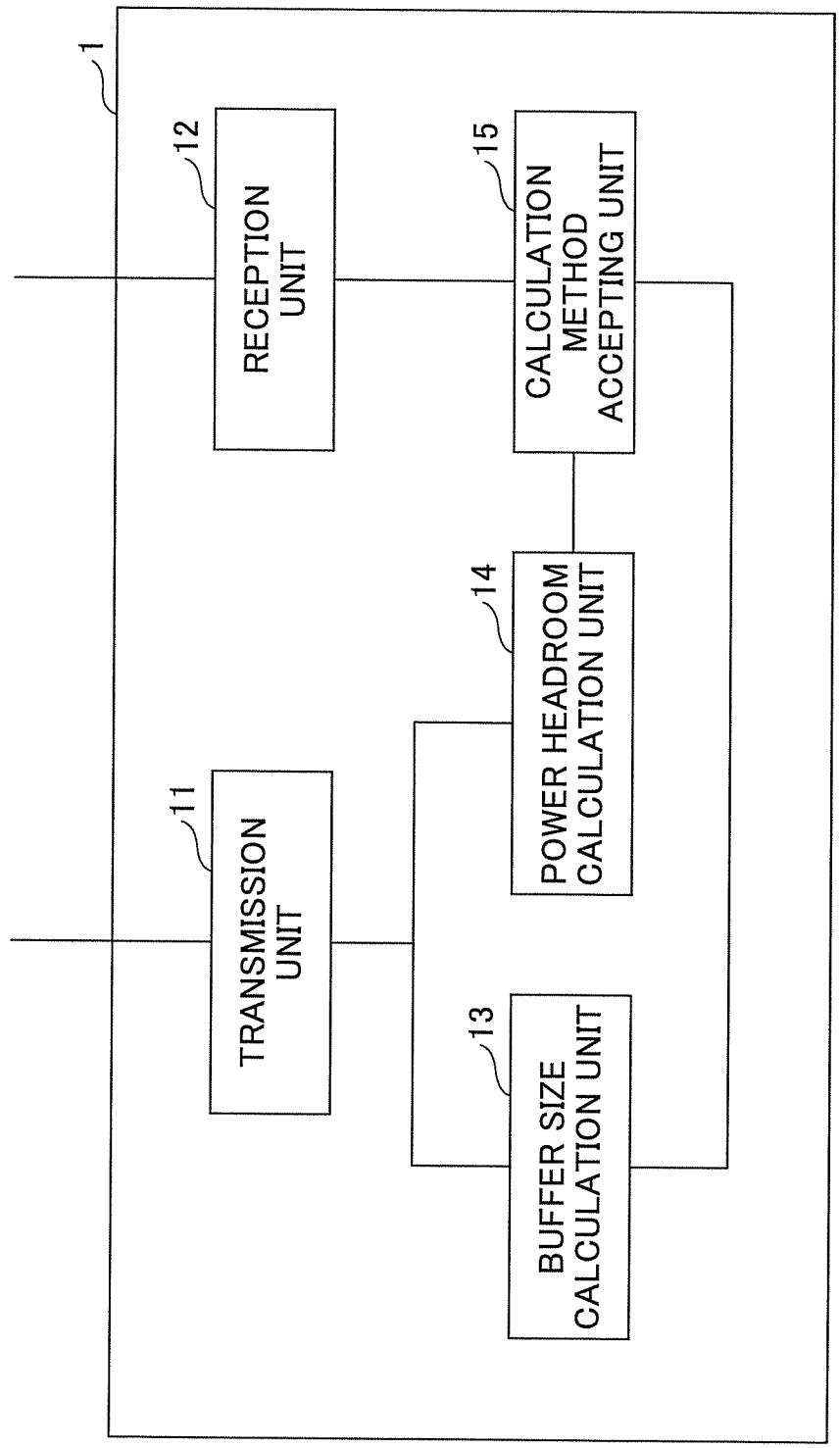
FIG. 3 is a drawing illustrating an example of a functional configuration of a terminal according to an embodiment.

FIG. 3 is a drawing illustrating an example of a functional configuration of a terminal 1 according to an embodiment. As illustrated in FIG. 3, the terminal 1 includes a transmission unit 11, a reception unit 12, a buffer size calculation unit 13, a power headroom calculation unit 14, and a calculation method accepting unit 15. FIG. 3 only illustrates functional units in the terminal 1 especially related to an embodiment. The terminal 1 also includes at least functions for performing operations according to LTE and 5G (not shown in the figure). Further, a functional structure illustrated in FIG. 3 is only an example. Functional classification and names of functional units may be anything as long as operations related to an embodiment can be performed. Further, the terminal 1 according to an embodiment may not include a part of functional units illustrated in FIG. 3 as long as it can perform operations related to an embodiment.

The transmission unit 11 obtains information (a buffer size or power headroom) to be reported to the base station 2 from the buffer size calculation unit 13 or the power headroom calculation unit 14, and transmits the information to the base station 2. Further, it is assumed that the transmission unit 11 includes a packet buffer, and performs processing of layer 1 (physical layer (PHY)), layer 2 (MAC, radio link control (RLC)), packet data convergence protocol (PDCP), and layer 3 (radio resource control (RRC)). Functions of the transmission unit 11 are not limited to the above.

The reception unit 12 receives from the base station 2 a message of a timing when information to be transmitted to the base station 2 should be calculated. Further, it is assumed that the reception unit 12 includes a packet buffer, and perform processing of layer 1 (PHY), layer 2 (MAC, RLC, PDCP), and layer 3 (RRC). Functions of the reception unit 12 are not limited to the above.

The buffer size calculation unit 13 calculates a buffer size (BS) based on an amount of data stored in a memory of the terminal 1 which should be transmitted to the base station 2, and uplink scheduling information indicated by a UL grant from the base station 2.

The power headroom calculation unit 14 calculates power headroom based on a condition of a radio wave the terminal 1 is receiving and various parameters including a modulation method, a code rate, etc., indicated by the UL grant from the base station 2.

The calculation method accepting unit 15 receives from the base station 2 an indication related to a buffer size calculation method or a power headroom calculation method, and transmits the received indication to the buffer size calculation unit 13 or the power headroom calculation unit 14.

(Base Station)

Figure 4:
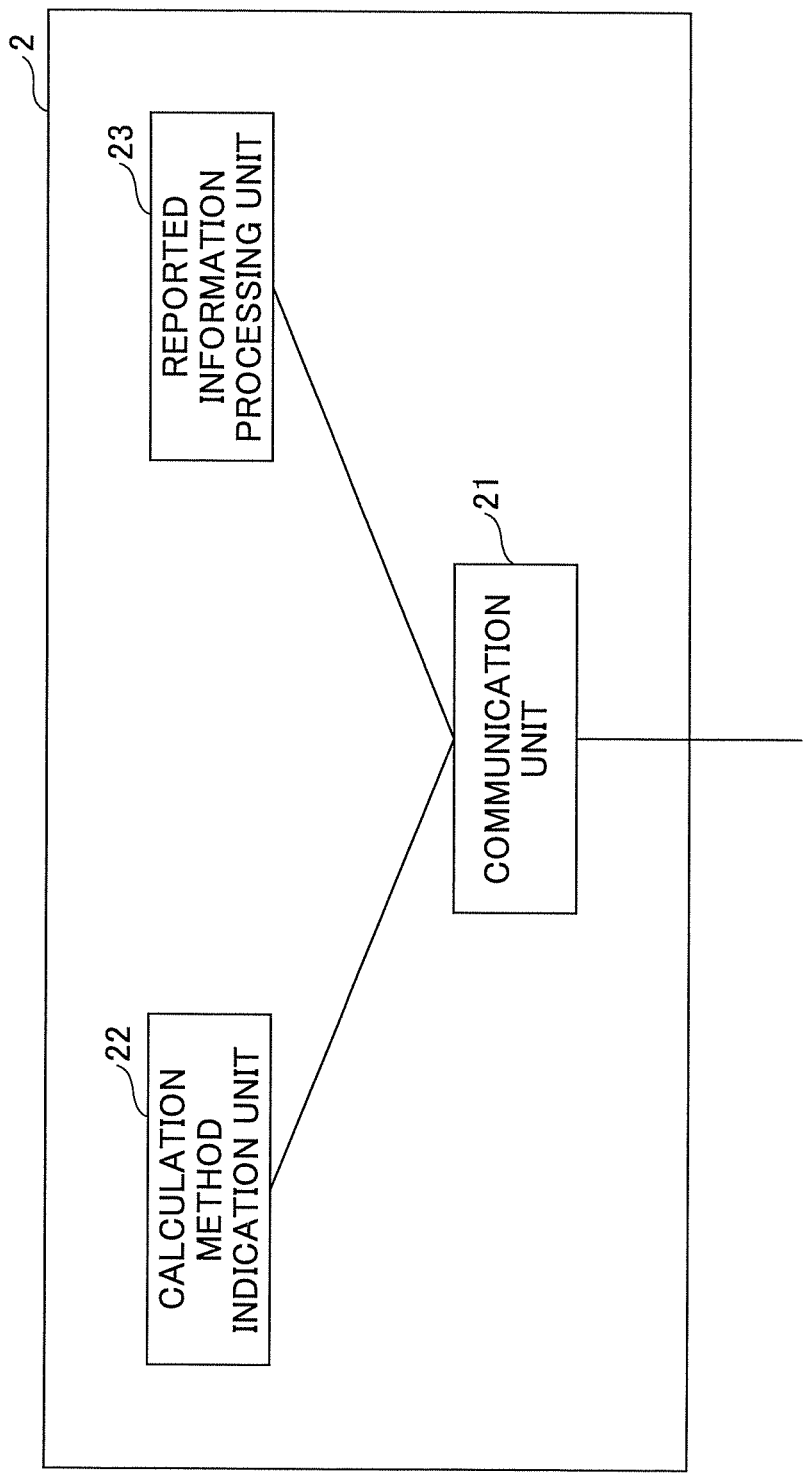
FIG. 4 is a drawing illustrating an example of a functional configuration of a base station according to an embodiment.

FIG. 4 is a drawing illustrating an example of a functional configuration of a base station according to an embodiment. As illustrated in FIG. 4, the base station 2 includes a communication unit 21, a calculation method indication unit 22, and a reported information processing unit 23. FIG. 4 only illustrates functional units in the base station 2 especially related to an embodiment. The base station 2 also includes at least functions for performing operations according to LTE and 5G (not shown in the figure). Further, a functional structure illustrated in FIG. 4 is only an example. Functional classification and names of functional units may be anything as long as operations related to an embodiment can be performed. Further, the base station 2 according to an embodiment may not include a part of functional units illustrated in FIG. 4 as long as it can perform operations related to an embodiment.

It is assumed that the communication unit 21 includes a packet buffer, and performs processing of layer 1 (PHY), layer 2 (MAC, RLC, PDCP), and layer 3 (RRC). Functions of the communication unit 21 are not limited to the above.

The calculation method indication unit 22 transmits to the terminal 1 an indication related to a buffer size calculation method or a power headroom calculation method. Specifically, the calculation method indication unit 22 transmits to the terminal 1 an indication specifying a subframe, of subframes of the SCell corresponding to a predetermined subframe of the PCell, an amount of data up to which subframe should be taken into account for calculating the buffer size. Further, the calculation method indication unit 22 transmits to the terminal 1 an indication which specifies power headroom of which subframe, of subframes of the SCell corresponding to a predetermined subframe of the PCell, should be calculated.

It should be noted that the calculation method indication unit 22 may transmit an indication indicating a calculation method to the terminal 1 by using RRC protocol, by using MAC CE, or by using physical channel control information (DCI) including PDCCH defined in PHY, etc.

The reported information processing unit 23 performs uplink scheduling processing, etc., based on the information (a buffer size, and/or power headroom) transmitted from the terminal 1.

The above-described functional structures of the terminal 1 and the base station 2 may be entirely realized by a hardware circuit (e.g., one or more IC chips), or may be partially realized by a hardware circuit and the remaining part may be realized by a CPU and programs.

(Terminal)

Figure 5:
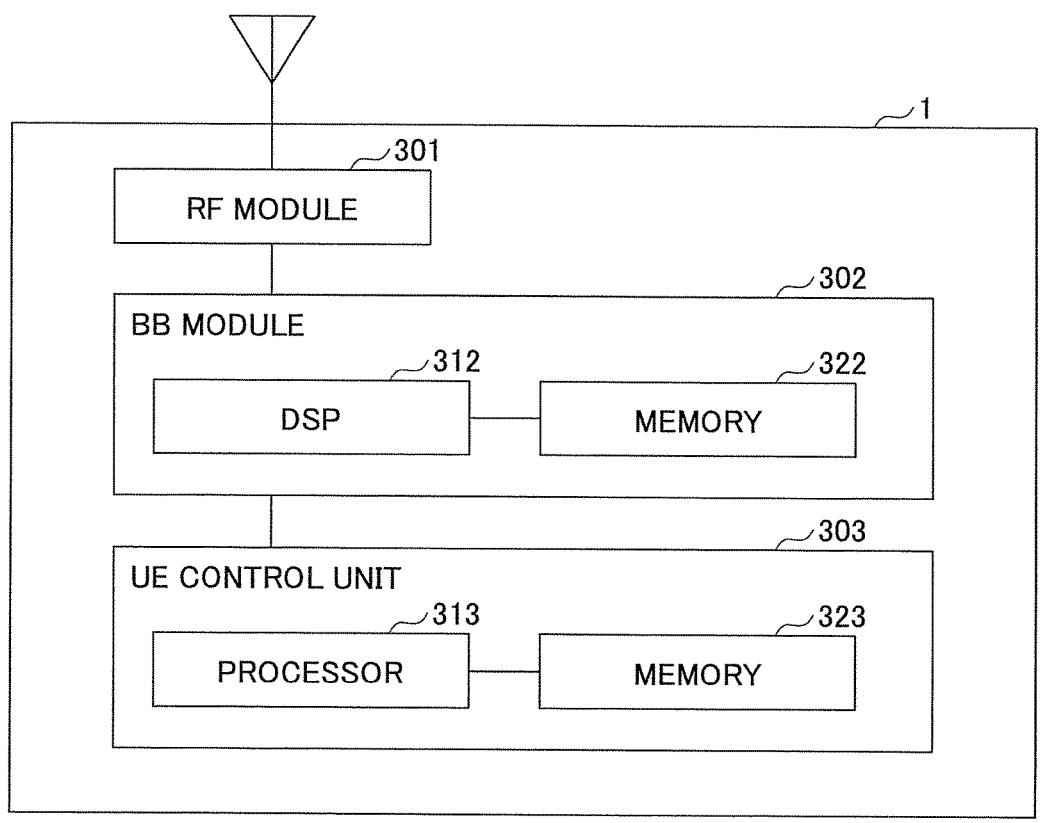
FIG. 5 is a drawing illustrating an example of a hardware configuration of a terminal according to an embodiment.

FIG. 5 is a drawing illustrating an example of a hardware configuration of a terminal 1 according to an embodiment. FIG. 5 illustrates a structure closer to an implementation example compared to FIG. 3. As illustrated in FIG. 5, the terminal 1 includes a radio frequency (RF) module 301 for performing a process related to a radio signal, a baseband (BB) processing module 302 for performing a baseband signal process, and a UE control module 303 for performing a process of an upper layer, etc.

The RF module 301 generates a radio signal to be transmitted from an antenna by performing digital-to-analog (D/A) conversion, modulation, frequency conversion, power amplification, etc., for a digital baseband signal received from the BB processing module 302. Further, the RF module 161 generates a digital baseband signal by performing frequency conversion, analog to digital (A/D) conversion, demodulation, etc., for a received radio signal, and transmits the generated signal to the BB processing module 302. The RF module 301 includes, for example, a part of the transmission unit 11 and a part of the reception unit 12 illustrated in FIG. 3.

The BB processing module 302 performs a process of converting bidirectionally between an IP packet and a digital baseband signal. A digital signal processor (DSP) 312 is a processor for performing signal processing in the BB processing module 302. A memory 322 is used as a work area of the DSP 312. The BB processing module 302 includes, for example, a part of the transmission unit 11, a part of the reception unit 12, the buffer size calculation unit 13, the power headroom calculation unit 14, and a part of the calculation method accepting unit 15 illustrated in FIG. 3.

The UE control module 303 performs an IP layer protocol process, processes of various kinds of applications, etc. A processor 313 performs a process for the UE control module 303. A memory 323 is used as a work area of the processor 313. The UE control module 303 includes, for example, a part of the transmission unit 11, a part of the reception unit 12, and a part of the buffer size calculation unit 13 illustrated in FIG. 3.

(Base Station)

Figure 6:
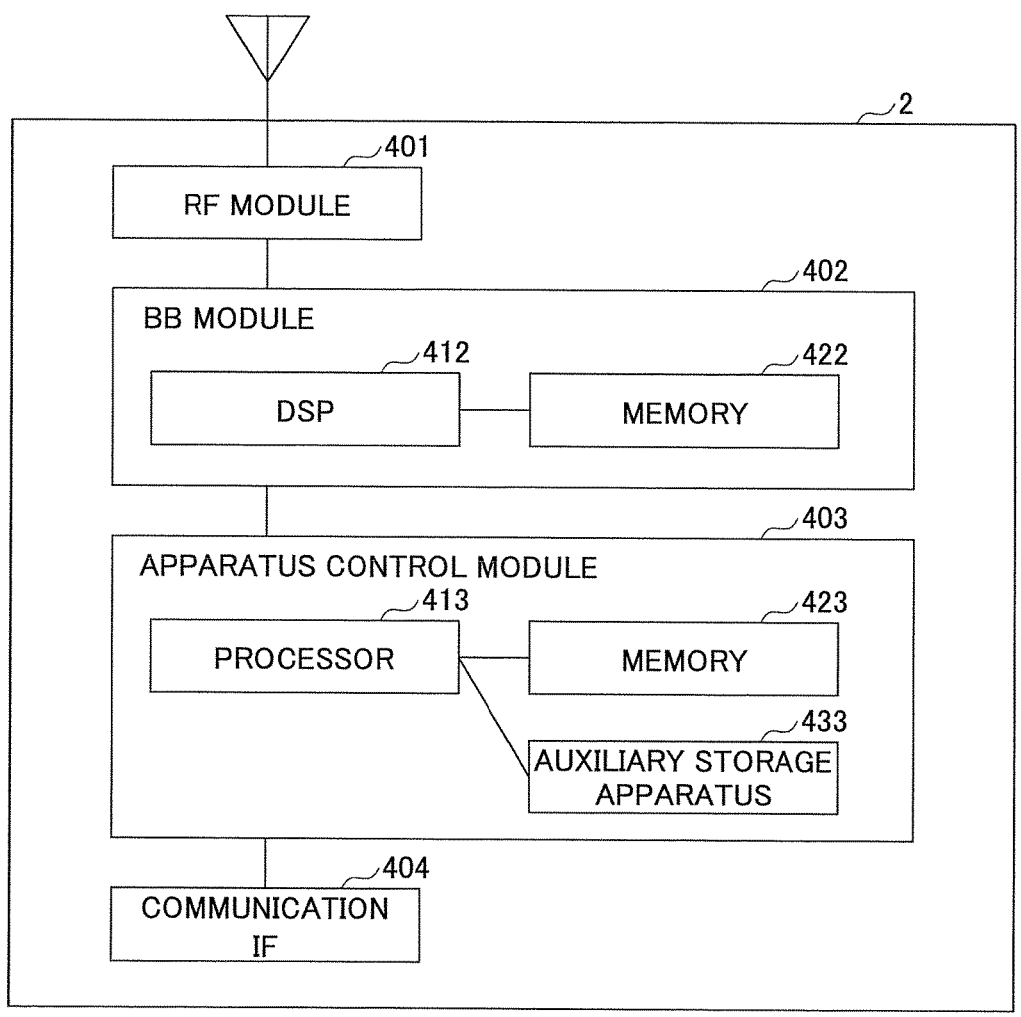
FIG. 6 is a drawing illustrating an example of a hardware configuration of a base station apparatus according to an embodiment.

FIG. 6 is a drawing illustrating an example of a hardware configuration of a base station 2 according to an embodiment. FIG. 6 illustrates a structure closer to an implementation example compared to FIG. 4. As illustrated in FIG. 6, the base station 2 includes an RF module 401 for performing a process related to a radio signal, a BB processing module 402 for performing a baseband signal process, an apparatus control module 403 for performing a process of an upper layer, etc., and a communication IF 404 as an interface for connecting to a network.

The RF module 401 generates a radio signal to be transmitted from an antenna by performing D/A conversion, modulation, frequency conversion, power amplification, etc., for a digital baseband signal received from the BB processing module 402. Further, the RF module 401 generates a digital baseband signal by performing frequency conversion, A/D conversion, demodulation, etc., for a received radio signal, and transmits the generated signal to the BB processing module 402. The RF module 401 includes, for example, a part of the communication unit 21 illustrated in FIG. 4.

The BB processing module 402 performs a process of converting bidirectionally between an IP packet and a digital baseband signal. DSP 412 is a processor for performing a signal processing in the BB processing module 402. A memory 422 is used as a work area of the DSP 412. The BB processing module 402 includes, for example, a part of the communication unit 21, a part of the calculation method indication unit 22, and the reported information processing unit 23 illustrated in FIG. 4.

The apparatus control module 403 performs an IP layer protocol process, an operation and maintenance (OAM) process, etc. A processor 413 performs a process for the apparatus control module 403. A memory 423 is used as a work area of the processor 413. An auxiliary storage apparatus 433 is, for example, a HDD, etc., and stores various kinds of setting information items, etc., used for operations of the base station 2. The apparatus control module 403 includes, for example, a part of the communication unit 21 and a part of the calculation method indication unit 22 illustrated in FIG. 4.

<Processing Steps>

In the following, processing steps will be described when the terminal 1 transmits information related to the buffer size and/or the power headroom to the base station 2.

It should be noted that, referring to FIG. 7 through FIG. 10, multiple processing steps (No. 1, No. 2, No. 3) in the case of buffer size report (BSR) will be described, and, referring to FIG. 11 through FIG. 14B, multiple processing steps (No. 1, No. 2, No. 3) in the case of power headroom report (PHR) will be described. In an embodiment, the above processing steps may be combined in many ways. For example, the processing step (No. 1) in the case of buffer size report may be combined with the processing step (No. 1) in the case of a power headroom report, with the processing step (No. 2) in the case of a power headroom report, or with the processing step (No. 3) in the case of a power headroom report. Further, the processing step (No. 2) in the case of buffer size report may be combined with the processing step (No. 1) in the case of a power headroom report, with the processing step (No. 2) in the case of a power headroom report, or with the processing step (No. 3) in the case of a power headroom report. Further, the processing step (No. 3) in the case of buffer size report may be combined with the processing step (No. 1) in the case of a power headroom report, with the processing step (No. 2) in the case of a power headroom report, or with the processing step (No. 3) in the case of a power headroom report.

(BSR: No. 1)

Figure 7:
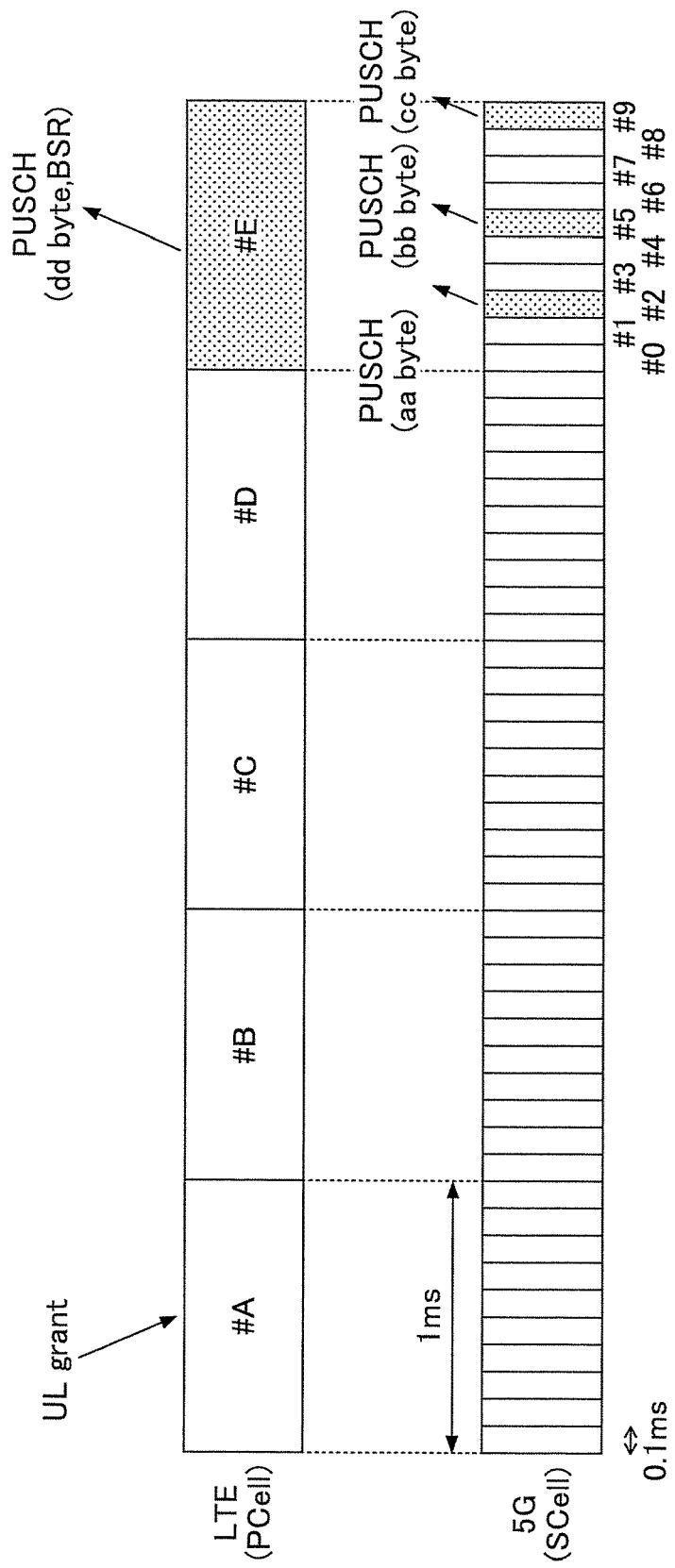
FIG. 7 is a drawing illustrating processing steps related to reporting a buffer size (No. 1).

FIG. 7 is a drawing illustrating processing steps related to a buffer size report (No. 1). In an example illustrated in FIG. 7, it is assumed that the PCell is an LTE cell, and the SCell is a 5G cell. Further, it is assumed that the TTI of the SCell is 0.1 ms. In other words, for each subframe of the PCell, there are 10 subframes of the SCell corresponding to the subframe of the PCell.

The terminal 1 transmits a buffer size report to the base station 2 triggered by, for example, a case where new data becomes transmission-available, a case of occurrence of data with higher priority than currently-being-transmitted data, or a case where a retransmission timer or a periodical timer has expired.

Here, for the sake of description convenience, subframes of the SCell corresponding to a subframe #5 of the PCell are referred to as, from the left to the right, a subframe #0, a subframe#1, a subframe #2, a subframe #3, a subframe #4, a subframe #5, a subframe #6, a subframe #7, a subframe #8, and a subframe #9.

Further, in an example of FIG. 7, it is assumed that a UL grant is transmitted by a subframe #A of the PCell, and, after 4 ms, according to scheduling of the UL grant, a buffer size report is transmitted by UL transmission of a subframe #E of the PCell. Further, it is assumed that uplink data of dd bytes is transmitted by the subframe #E of the PCell, uplink data of aa bytes is transmitted by the subframe #2, uplink data of bb bytes is transmitted by the subframe #5 of the SCell, and uplink data of cc bytes is transmitted by the subframe #9 of the SCell.

It is assumed that the following processing steps are defined beforehand in 3GPP specifications, etc., in which processing steps, the terminal 1 calculates the buffer size by taking into account the data to be transmitted by all subframes of the SCell corresponding to the subframe of the PCell by which subframe the buffer size report is transmitted.

Referring to FIG. 7, a specific processing method will be described. The buffer size calculation unit 13 calculates the buffer size by taking into account, in addition to the amount of data to be transmitted by the PCell, the amount of data to be transmitted by all of the subframes (#0 through #9) of the SCell corresponding to the subframe #E of the PCell by which the buffer size report is transmitted. In an example of FIG. 7, assuming that the data amount in the terminal 1 is xx bytes, the buffer size calculated by the buffer size calculation unit 13 is xx bytes—(aa+bb+cc+dd) bytes. Further, the calculated buffer size of the terminal 1 is reported to the base station 2 by the transmission unit 11 by using a PUSCH of the subframe #E of the PCell.

(BSR: No. 2)

Figures 8B, 9:
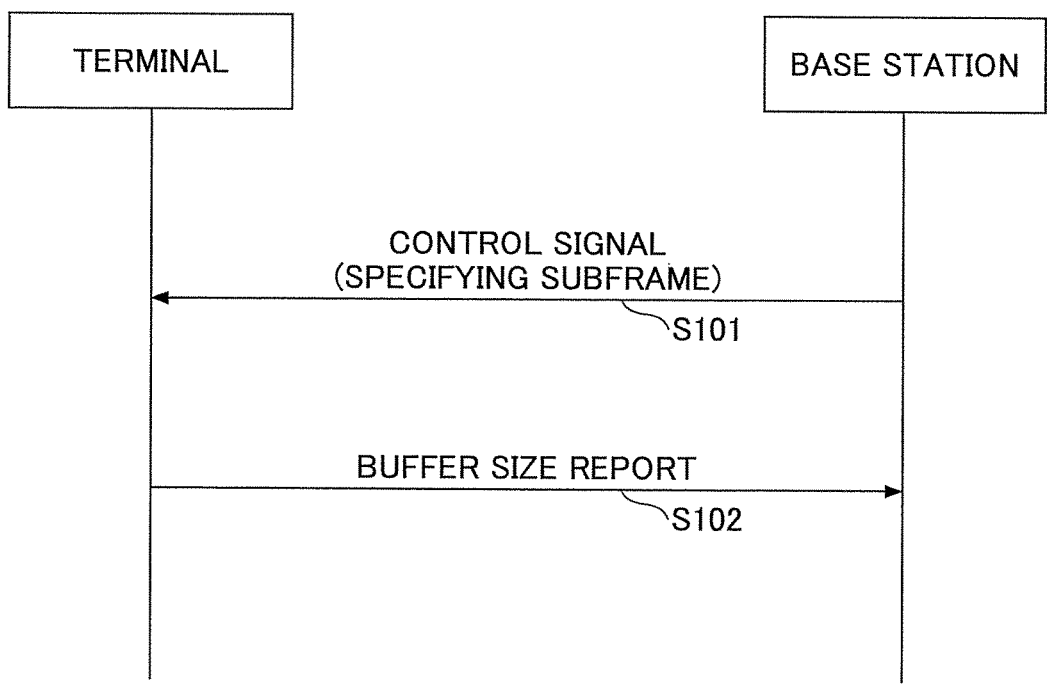
FIG. 8B is a drawing illustrating processing steps related to reporting a buffer size (No. 2).
FIG. 9 is a sequence diagram illustrating processing steps related to reporting a buffer size (No. 2).

FIG. 8A and 8B are drawings illustrating processing steps related to a buffer size report (No. 2). The things not described in the processing steps (No. 2) descriptions should be the same as those of the processing steps (No. 1) of FIG. 7.

In the processing steps (No. 2), the buffer size calculation unit 13 calculates the buffer size, not by taking into account the amount of data to be transmitted by all of the subframes (#0 through #9) of the SCell corresponding to the subframe #E of the PCell by which the buffer size report is transmitted, but by taking into account the amount of data to be transmitted by the subframes, of the subframes of the SCell, up to the subframe specified by the base station 2.

Referring to FIG. 8A, the processing steps (No. 2) will be specifically described. For example, if it is assumed that the subframe #5 of the SCell is specified by the base station 2, then the buffer size calculation unit 13 calculates the buffer size by taking into account the amount of data to be transmitted by the subframes, of all the subframes of the SCell corresponding to the subframe of the PCell by which the buffer size report is transmitted, up to the subframe #5.

In other words, in an example of FIG. 8A, assuming that the data amount in the terminal 1 is xx bytes, the buffer size calculated by the buffer size calculation unit 13 is xx bytes—(aa+bb+dd) bytes.

FIG. 8B illustrates an example format of information included in a control signal transmitted from the base station 2 when the base station 2 transmits to the terminal 2 the information specifying a subframe of the SCell. Bits of "#0" through "#9" correspond to the subframes #0 through #9 of FIG. 8A, respectively. "R" bit represents a reserved bit. For example, in the case where the base station 2 transmits to the terminal 1 information indicating that the terminal 1 should take into account the amount of data up to the subframe #5, "1" is set in a bit of "#5". It should be noted that, in the case where there are multiple SCells included in CA, the format of FIG. 8B may be enhanced according to the number of the SCells. It should be noted that the format illustrated in FIG. 8B is only an example, and other formats may be used.

FIG. 9 is a sequence diagram illustrating processing steps related to a buffer size report (No. 2).

In step S101, the calculation method indication unit 22 of the base station 2 transmits to the terminal 1 a control signal including information specifying a subframe of the SCell. The information specifying a subframe has a format, for example, illustrated in FIG. 8B. Regarding the control signal, for example, an RRC connection signal may be used, a MAC layer command may be used, or control information (DCI) of a physical channel such as PDCCH defined by PHY may be used. Subsequently, the calculation method accepting unit 15 of the terminal 1 transmits the specifying information from the base station 2 to the buffer size calculation unit 13.

In step S102, the buffer size calculation unit 13 of the terminal 1 calculates the buffer size base on the subframe of the SCell specified in step S101. Further, the transmission unit 11 sets the calculated buffer size in MAC CE and transmits it to the base station 2 by using a PUSCH of the PCell.

It should be noted that, in the processing steps, in the case where a subframe of the SCell is not specified by the base station 2, the buffer size calculation unit 13 of the terminal 1 may calculate the buffer size according to the processing steps (No. 1) illustrated in FIG. 7.

(BSR: No. 3)

Figure 10A:
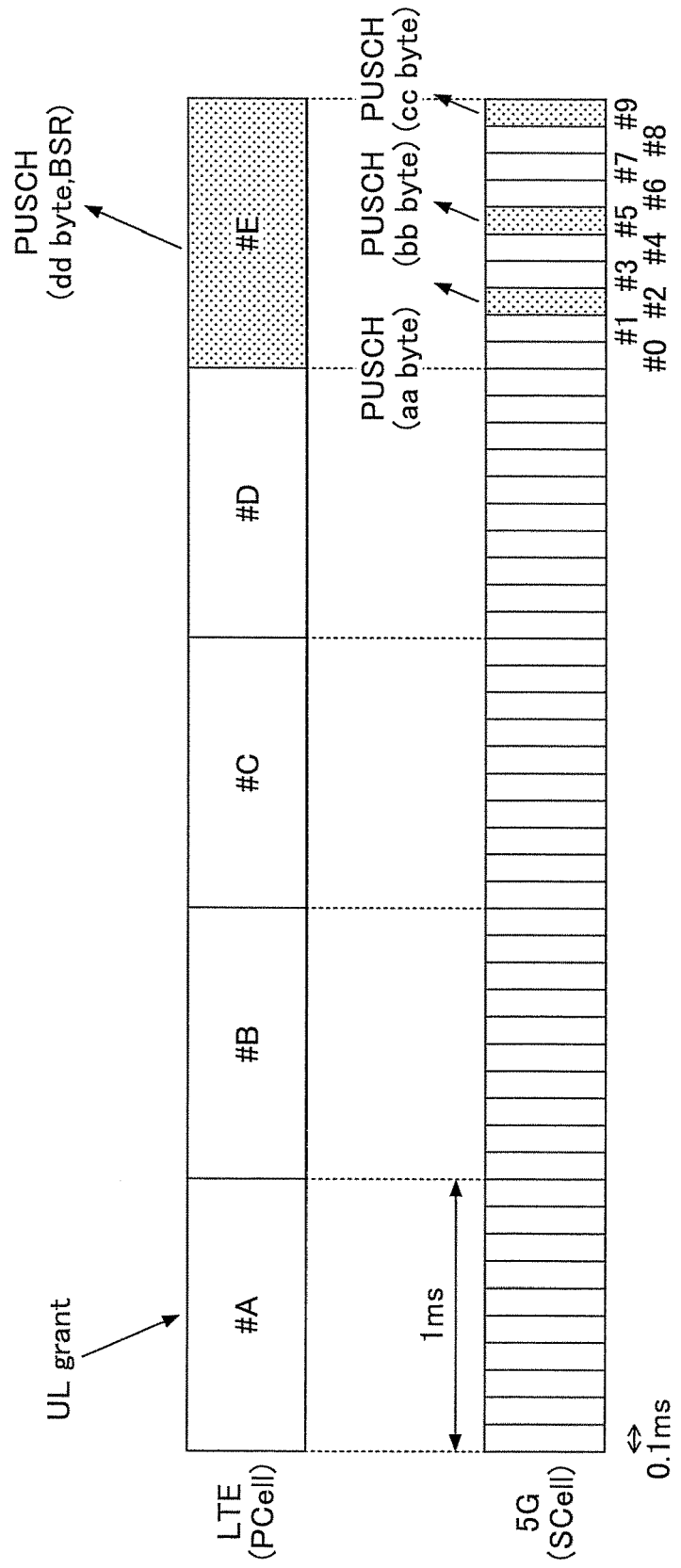
FIG. 10A is a drawing illustrating processing steps related to reporting a buffer size (No. 3).

FIGS. 10A and 10B are drawings illustrating processing steps related to a buffer size report (No. 3). The things not described in the processing steps (No. 3) descriptions may be the same as those of the processing steps (No. 1) of FIG. 7.

In the processing steps (No. 3), the buffer size calculation unit 13 calculates the buffer size not by taking into account the amount of data to be transmitted by all of the subframes (#0 through #9) of the SCell corresponding to the subframe #E of the PCell by which the buffer size report is transmitted, but the terminal 1 determines by itself up to which subframe of the subframes of the SCell, the amount of data to be transmitted by the subframes should be taken into account. Further, when transmitting the buffer size report to the base station 2, the transmission unit 11 also transmits to the base station 2 information indicating up to which subframe of the subframes of the SCell, the amount of data to be transmitted by the subframes has been taken into account.

Referring to FIG. 10A, the processing steps (No. 3) will be specifically described. For example, it is assumed that data of aa bytes is to be transmitted by the subframe #2 of the SCell, data of bb bytes is to be transmitted by the subframe #5 of the SCell, and data of cc bytes is to be transmitted by the subframe #9 of the SCell. Further, data of dd bytes is to be transmitted by the subframe #E of the PCell.

First, the buffer size calculation unit 13 determines whether: the amount of data to be transmitted up to the subframe #2 of the SCell should be taken into account; the amount of data to be transmitted up to the subframe #5 of the SCell should be taken into account; or the amount of data to be transmitted up to the subframe #9 of the SCell should be taken into account. The buffer size calculation unit 13 may determine up to which subframe amount of data to be transmitted according to, for example, a state of processing load of the terminal 1, or, the number of the subframes of the SCell by which PUSCH transmission is performed (uplink data transmission is scheduled).

Subsequently, the buffer size calculation unit 13 calculates the buffer size to be reported to the base station 2. For example, in the case where it is determined that the amount of data to be transmitted up to the subframe #2 of the SCell should be taken into account, assuming that the data amount in the terminal 1 is xx bytes, the buffer size calculated by the buffer size calculation unit 13 is xx bytes—(aa+dd) bytes.

Subsequently, the transmission unit 11 transmits the calculated buffer size to the base station 2. At this time, in the MAC CE transmitted to the base station 2 by the subframe #E of the PCell, information, indicating up to which subframe the amount of data to be transmitted is taken into account, is included.

FIG. 10B illustrates a format example of the MAC CE used for the buffer size report. The first octet is the same as the MAC CE format for BSR defined in the existing LTE specifications. The second octet and the third octet are information for specifying a subframe. Bits of "#0" through "#9" correspond to the subframes #0 through #9 of FIG. 10A, respectively. "R" bit represents a reserved bit. For example, in the case where the buffer size is calculated by taking into account the amount of data up to the subframe #2 of the SCell, "1" is set in "#2" bit by the transmission unit 11.

It should be noted that, in the case where there are multiple SCells included in CA, the format of FIG. 10B may be enhanced according to the number of the SCells. It should be noted that the format illustrated in FIG. 10B is only an example, and other formats may be used.

(PHR: No. 1)

FIG. 11 is a drawing illustrating processing steps related to a power headroom report (No. 1). In an example illustrated in FIG. 11, it is assumed that the PCell is an LTE cell, and the SCell is a 5G cell. Further, it is assumed that the TTI of the SCell is 0.1 ms. In other words, for each subframe of the PCell, there are 10 subframes of the SCell corresponding to the subframe of the PCell.

Triggered by, for example, a case where a path loss (propagation loss) measured by the terminal 1 has changed greatly, or a case where predetermined time has elapsed from the previous PHR report, the terminal 1 transmits information of power headroom to the base station.

Here, for the sake of description convenience, subframes of the SCell corresponding to a subframe #E of the PCell are referred to as, from the left to the right, a subframe #0, a subframe #1, a subframe #2, a subframe #3, a subframe #4, a subframe #5, a subframe #6, a subframe #7, a subframe #8, and a subframe #9.

Further, in an example of FIG. 11, it is assumed that a UL grant is transmitted by a subframe #A of the PCell, and, after 4 ms, the buffer size report is transmitted by UL transmission of a subframe #E of the PCell according to the UL grant scheduling. Further, it is assumed that the uplink data transmission is performed by using subframes #2, #5, and #9 of the SCell.

In the processing steps (No. 1), it is assumed that it is defined in the 3GPP specifications beforehand power headroom in which subframe should be reported by the terminal 1 in the case where reporting the power headroom of the SCell whose TTI is less than that of the PCell.

Referring to FIG. 11, a specific processing steps (No. 1) will be described. First, a first processing step will be described. In the case where it is defined that the power headroom of the subframe, of the subframes of the SCell corresponding to the subframe of the PCell, by which the first uplink data transmission is to be performed (PUSCH transmission is to be performed) should be reported, the power headroom calculation unit 14 calculates the power headroom of the subframe #E of the PCell and the power headroom of the subframe #2 of the SCell.

Next, a second processing step will be described. For example, in the case where it is defined that the power headroom of the subframe, of the subframes of the SCell corresponding to the subframe of the PCell, by which the last uplink data transmission is to be performed (PUSCH transmission is to be performed) should be reported, the power headroom calculation unit 14 calculates the power headroom of the subframe #E of the PCell and the power headroom of the subframe #9 of the SCell.

Next, a third processing step will be described. For example, in the case where it is defined that the power headroom of the subframe, of the subframes of the SCell corresponding to the subframe of the PCell, by which the second uplink data transmission is to be performed (PUSCH transmission is to be performed) should be reported, the power headroom calculation unit 14 calculates the power headroom of the subframe #E of the PCell and the power headroom of the subframe #5 of the SCell.

It should be noted that the power headroom of the PCell and the SCell calculated by the processing steps are reported to the base station 2 by using a PUSCH of the subframe #E of the PCell.

(PHR: No. 2)

Figure 12A:
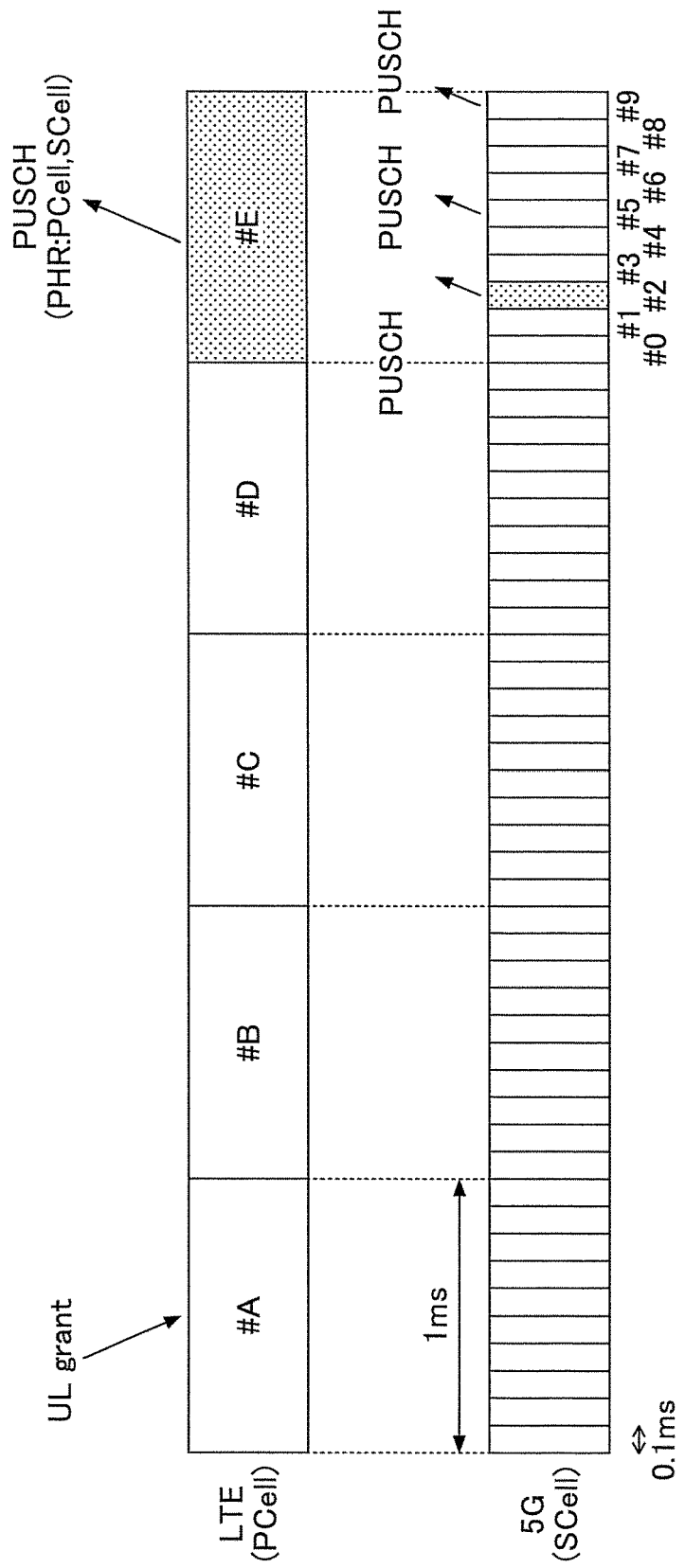
FIG. 12A is a drawing illustrating processing steps related to a power headroom report (No. 2).
Figures 12B, 13:
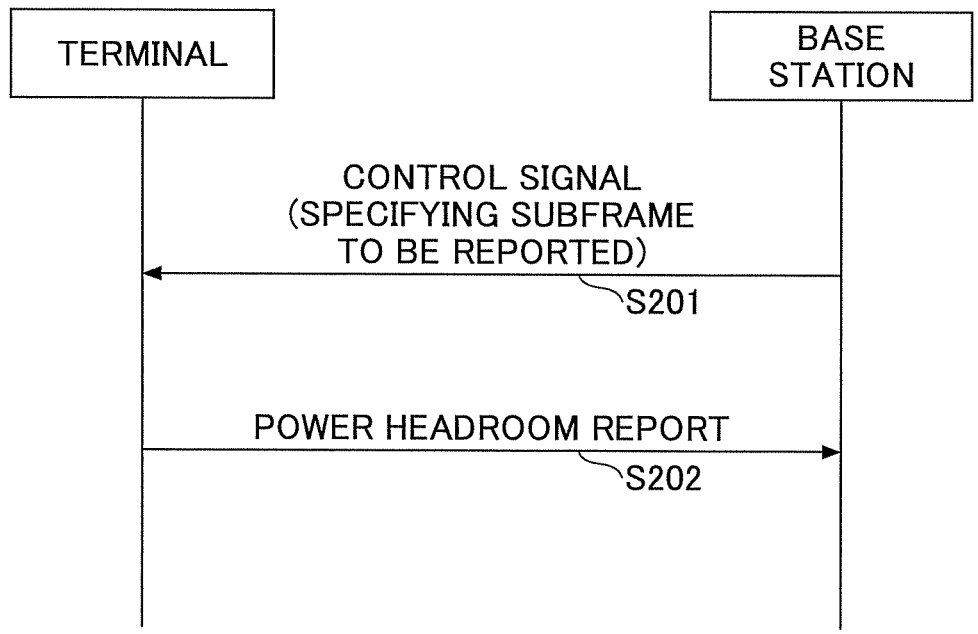
FIG. 12B is a drawing illustrating processing steps related to a power headroom report (No. 2).
FIG. 13 is a sequence diagram illustrating processing steps related to a power headroom report (No. 2).

FIGS. 12A and 12B are drawings illustrating processing steps related to a power headroom report (No. 2). The things not described in the processing steps (No. 2) descriptions may be the same as those of the processing steps (No. 1) of FIG. 11.

In the processing steps (No. 2), in the case of reporting power headroom of the SCell whose TTI is less than that of the PCell, the power headroom in the subframe of the SCell, which subframe is specified by the base station 2, is reported.

Referring to FIG. 12A, the processing steps (No. 2) will be specifically described. For example, if the subframe #2 of the SCell is specified by the base station 2, then the power headroom calculation unit 14 calculates the power headroom of the subframe #E of the PCell and the power headroom of the subframe #2 of the SCell. Subsequently, the transmission unit 11 transmits the calculated power headroom to the base station 2.

FIG. 12B illustrates an example format of information included in a control signal transmitted from the base station 2 when the base station 2 transmits to the terminal 1 the information specifying a subframe of the SCell. Bits of "#0" through "#9" correspond to the subframes #0 through #9 of FIG. 12A, respectively. "R" bit represents a reserved bit. For example, in the case where the base station 2 transmits to the terminal 1 information indicating that the terminal 1 should report the power headroom of the subframe #2, "1" is set in a bit of "#2". It should be noted that, in the case where there are multiple SCells included in CA, the format of FIG. 12B may be enhanced according to the number of the SCells. It should be noted that the format illustrated in FIG. 12B is only an example, and other formats may be used.

FIG. 13 is a sequence diagram illustrating processing steps related to a power headroom report (No. 2).

In step S201, the calculation method indication unit 22 of the base station 2 transmits to the terminal 1 a control signal including information specifying a subframe of the SCell. The information specifying a subframe has a format, for example, illustrated in FIG. 12B. Regarding the control signal, for example, an RRC connection signal may be used, a MAC layer command may be used, or control information (DCI) of a physical channel such as PDCCH defined by PHY may be used. The calculation method accepting unit 15 of the terminal 1 transmits the specifying information from the base station 2 to the power headroom calculation unit 14.

In step S202, the power headroom calculation unit 14 of the terminal 1 calculates the power headroom of the subframe of the PCell and the power headroom of the subframe of the SCell which subframe has been specified in step S201. Subsequently, the transmission unit 11 transmits the calculated power headroom to the base station 2.

It should be noted that, in the processing steps (No. 2), in the case where the subframe of the SCell is not specified by the base station 2, the power headroom calculation unit 14 of the terminal 1 may calculate the power headroom according to the processing steps (No. 1) illustrated in FIG. 11.

(PHR: No. 3)

Figure 14A:
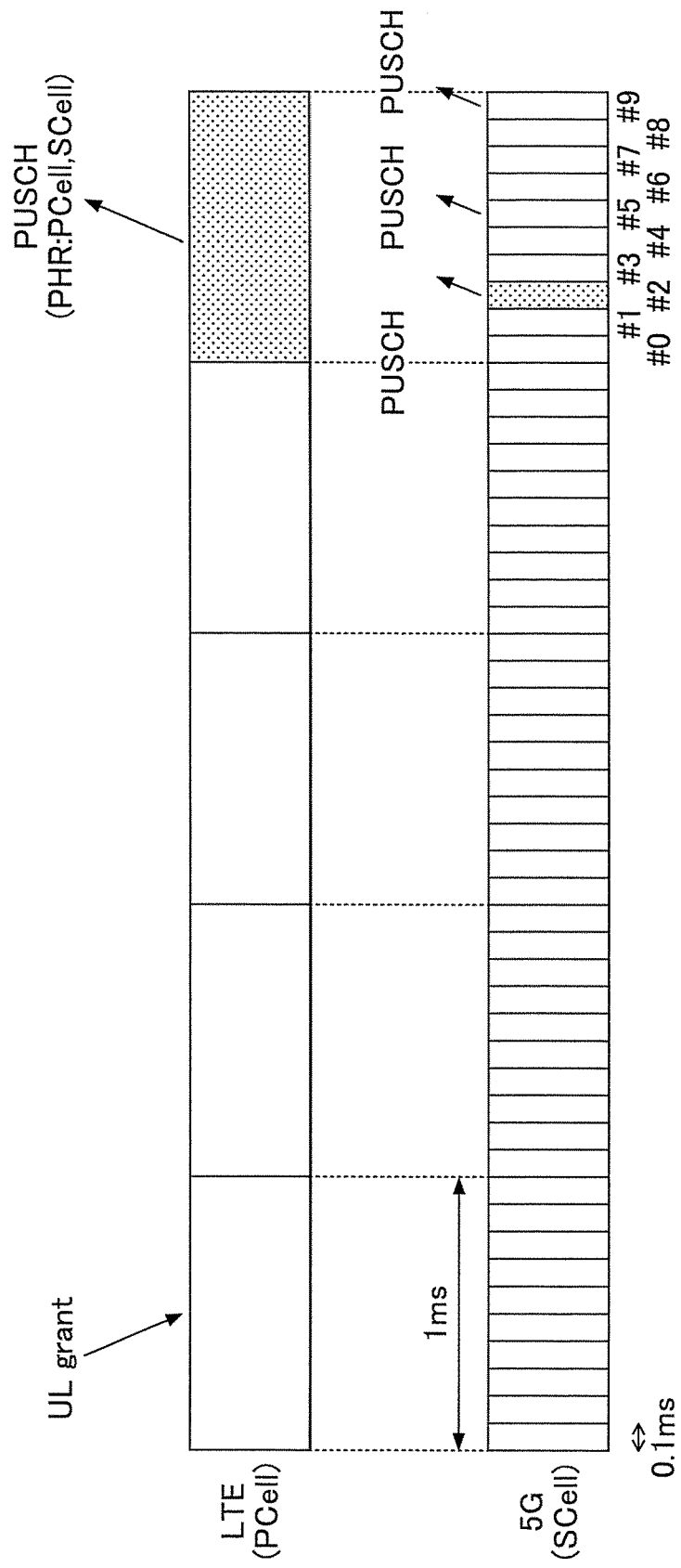
FIG. 14A is a drawing illustrating processing steps related to a power headroom report (No. 3).

FIGS. 14A and 14B are drawings illustrating processing steps related to a power headroom report (No. 3). The things not described in the processing steps (No. 3) descriptions may be the same as those of the processing steps (No. 1) of FIG. 11.

In the processing steps (No. 3), the subframe of the SCell, power headroom of which subframe should be reported, is determined by the terminal 1 itself. Further, when transmitting the power headroom report, the transmission unit 11 also transmits to the base station 2 information indicating the power headroom of which subframe is reported by the power headroom report.

Referring to FIG. 14A, the processing steps (No. 3) will be specifically described. First, the power headroom calculation unit 14 determines the power headroom of which subframe, of the subframe #2, the subframe #5, and the subframe #9 by which uplink data transmission is performed by the SCell, should be reported to the base station 2. An example of FIG. 14A illustrates a case where it is determined that the power headroom of the subframe #2 should be reported to the base station 2. The power headroom calculation unit 14 may determine the power headroom of which subframe should be reported to the base station 2 according to, for example, the number of subframes by which a PUSCH transmission is performed.

The power headroom calculation unit 14 may determine the power headroom of which subframe should be reported to the base station 2 according to the amount of the power headroom of the subframes. For example, the power headroom calculation unit 14 may select a subframe whose power headroom is the greatest, or may select a subframe whose power headroom is the least.

Subsequently, the power headroom calculation unit 14 calculates the power headroom of the subframe #E of the PCell and the power headroom of the subframe of the SCell which subframe has been determined by the terminal 1 itself. Subsequently, the transmission unit 11 transmits the calculated power headroom to the base station 2. At this time, in a MAC CE transmitted to the base station 2 by the subframe #E of the PCell, the transmission unit 11 includes information indicating power headroom of which subframe, of the subframes of the SCell, will be reported.

FIG. 14B illustrates an example of MAC CE format. The 1st through 7th octets are the same as MAC CE format for PHR defined in the existing LTE specifications, and thus, the description will be omitted. The 8th octet and the 9th octet are used for information for specifying a subframe of the SCell. Bits of "#0" through "#9" correspond to the subframes #0 through #9 of FIG. 12A, respectively. "R" bit represents a reserved bit. For example, in the case of reporting the power headroom of the subframe #2 of the SCell, "1" is set in "#2" bit by the transmission unit 11.

It should be noted that, in the case where there are multiple SCells included in CA, the format of FIG. 14B may be enhanced according to the number of the SCells. It should be noted that the format illustrated in FIG. 14B is only an example, and other formats may be used.

<Effect>

As described above, in a mobile communication system according to an embodiment, in the case where information used for controlling communications is reported from a terminal 1 to a base station 2 in CA in which the TTI of an SCell is less than the TTI of a PCell, the base station 2 and the terminal 1 share information related to which subframe, of the subframes of the SCell corresponding to a predetermined subframe of the PCell which is used for the report, is used for calculating the information used for controlling communications. With the above arrangement, it is possible for a mobile communication system according to an embodiment to control communications appropriately based on more accurate information.

As described above, in a mobile communication system according to an embodiment, in the case where information used for controlling communications (buffer size or power headroom) is reported from a terminal 1 to a base station 2, it is possible for the base station 2 to transmit information related to which subframe, of the subframes of the SCell corresponding to a predetermined subframe of the PCell which is used for the report, is used for calculating the information used for controlling communications. With the above arrangement, it is possible for the terminal 1 according to an embodiment to calculate information to be reported to the base station 2 according to an indication from the base station 2.

As described above, in a mobile communication system according to an embodiment, in the case where information used for controlling communications (buffer size or power headroom) is reported from a terminal 1 to a base station 2, it is possible for the terminal 1 to determine by itself which subframe, of the subframes of the SCell corresponding to a predetermined subframe of the PCell which is used for the report, is used for calculating the information used for controlling communications, and to report the determined subframe to the base station 2. With the above arrangement, it is possible for the terminal 1 according to an embodiment to change the processing method appropriately according to a state of processing load of the terminal 1, or the number of subframes used for performing PUSCH transmission.

Further, in a mobile communication system according to an embodiment, in the case of reporting the power headroom of the SCell to the base station 2, it is possible for the terminal 1 to determine by itself a power headroom of which subframe will be reported to the base station 2 according to the amount of the power headroom of the subframes. With the above arrangement, it is possible for the terminal 1 according to an embodiment to change the processing method appropriately according to a communication situation.

<Embodiment Summary>

As described above, a terminal according to an embodiment is provided. The terminal communicates with a base station in a mobile communication system which supports carrier aggregation provided by a first cell and a second cell which uses a subframe whose time interval is less than a time interval of a subframe of the first cell. The terminal includes a calculation unit configured to calculate reporting information to be reported to the base station based on a specific subframe, of a plurality of subframes of the second cell corresponding to a predetermined subframe of the first cell, shared by the base station and the terminal; and a reporting unit configured to report the reporting information calculated by the calculation unit to the base station.

The terminal may include an accepting unit configured to accept an indication of the specific subframe.

The reporting unit may report the reporting information and an identifier for identifying the specific subframe to the base station.

The reporting information may be at least one of BSR and PHR.

The calculation unit may calculate the PHR in the specific subframe in the case where the reporting information is the PHR.

The calculation unit may select the specific subframe based on a PH value in the case where the reporting information is the PHR.

The calculation unit may calculate the BSR based on a data amount of uplink data remaining in a buffer of the terminal at the time when data has been transmitted by the specific subframe in the case where the reporting information is the BSR.

Further, a communication control method according to an embodiment is provided. The communication control method is performed by a terminal which communicates with a base station in a mobile communication system which supports carrier aggregation provided by a first cell and a second cell which uses a subframe whose time interval is less than a time interval of a subframe of the first cell. The communication control method includes calculating reporting information to be reported to the base station based on a specific subframe, of a plurality of subframes of the second cell corresponding to a predetermined subframe of the first cell, shared by the base station and the terminal; and reporting the reporting information calculated by the calculating to the base station.

Further, a communication control method according to an embodiment is provided. The communication control method is performed by a mobile communication system including a base station and a terminal. The mobile communication system supports carrier aggregation provided by a first cell and a second cell which uses a subframe whose time interval is less than a time interval of a subframe of the first cell. The communication control method includes calculating reporting information to be reported to the base station based on a specific subframe, of a plurality of subframes of the second cell corresponding to a predetermined subframe of the first cell, shared by the base station and the terminal; and reporting the reporting information calculated by the calculating to the base station; and performing, by the base station, an uplink scheduling process by using the reported reporting information.

Further, the "unit" included in the above apparatuses may be substituted by "means", "circuit", "device", etc.

<Supplementary Description of Embodiment>

As described above, in an embodiment, the base station 2 transmits to the terminal 1 a control signal including information indicating a subframe in order to indicate a buffer size calculation method in step S101 of FIG. 9, and transmits a control signal including information indicating a subframe in order to indicate the subframe for which power headroom will be calculated in step S201 of FIG. 13. However, the base station 2 may not transmit different control signals to the terminal 1 but may transmit an integrated control signal. Further, the terminal 1 may calculate the buffer size and the power headroom based on the subframe specified by the received control signal. With the above arrangement, it is possible to reduce a signal amount of control signals.

As described above, according to an embodiment, the terminal reports to the base station the calculated buffer size and the power headroom by using a PUSCH of the PCell. It is not required for the terminal to transmit the report by using a PUSCH of the PCell. For example, the terminal may transmit to the base station a MAC CE including the calculated buffer size or the power headroom by using a PUSCH of the 5G SCell, or by using a PUSCH of another SCell (e.g., LTE SCell).

As described above, embodiments have been described. The disclosed invention is not limited to these embodiments, and a person skilled in the art would understand various variations, modifications, replacements, or the like. Specific examples of numerical values have been used for encouraging understanding of the present invention. These numeric values are merely examples and, unless otherwise noted, any appropriate values may be used. In the above description, partitioning of items is not essential to the present invention. Matters described in more than two items may be combined if necessary. Matters described in one item may be applied to matters described in another item (as long as they do not conflict). In a functional configuration diagram, boundaries of functional units or processing units do not necessarily correspond to physical boundaries of parts. Operations of multiple functional units may be physically performed in a single part, or operations of a single functional unit may be physically performed by multiple parts.

As described above, all or a part of an embodiment may be implemented by a program. The program may be stored in a random access memory (RAM), a flash memory, a read-only memory (ROM), an EPROM, an EEPROM, a register, a hard disk drive (HDD), a removable disk, a CD-ROM, a database, a server, or any other appropriate recording medium.

As described above, in an embodiment, an LTE cell is an example of a first cell. A 5G cell is an example of a second cell. A buffer size (BS) and/or power headroom (PH) is an example of reporting information. The buffer size calculation unit 13 and/or a power headroom calculation unit 14 is an example of a calculation unit. The communication unit 11 is an example of a reporting unit.

The present application is based on and claims the benefit of priority of Japanese Priority Application No. 2015-032255 filed on Feb. 20, 2015, the entire contents of which are hereby incorporated by reference.

DESCRIPTION OF THE REFERENCE NUMERALS

1 Terminal
2 Base station
11 Transmission unit
12 Reception unit
13 Buffer size calculation unit
14 Power headroom calculation unit
15 Calculation method accepting unit
21 Communication unit
22 Calculation method indication unit
23 Reporting information processing unit

What is claimed is:

1. A terminal which communicates with a base station in a mobile communication system that supports carrier aggregation, the terminal comprising:
   a processor that calculates reporting information to be transmitted to the base station based on at least one specific predetermined time unit shared by the base station and the terminal; and
   a transmitter that transmits the reporting information to the base station,
   wherein the carrier aggregation is provided by a first cell that uses a first predetermined time unit and a second cell that uses a second predetermined time unit of which a time interval of the second predetermined time unit is less than a time interval of the first predetermined time unit,
   wherein multiple second predetermined time units of the second cell correspond to the first predetermined time unit, and
   wherein the at least one specific predetermined time unit is at least one of the multiple second predetermined time units.

2. The terminal according to claim 1, further comprising: a receiver that receives an indication of the specific predetermined time unit.

3. The terminal according to claim 1, wherein the transmitter transmits the reporting information and an identifier for identifying the specific predetermined time unit to the base station.

4. The terminal according to claim 1, wherein the reporting information is at least one of a buffer status report, BSR and a power headroom report, PHR.

5. The terminal according to claim 4, wherein the processor calculates the PHR in the specific predetermined time unit in the case where the reporting information is the PHR.

6. The terminal according to claim 4, wherein the processor selects the specific predetermined time unit based on a power headroom, PH value in the case where the reporting information is the PHR.

7. The terminal according to claim 4, wherein the processor calculates the BSR based on a data amount of uplink data remaining in a buffer of the terminal at the time when data has been transmitted by the specific predetermined time unit in the case where the reporting information is the BSR.

8. A communication control method performed by a terminal that communicates with a base station in a mobile communication system that supports carrier aggregation, the communication control method comprising:
calculating reporting information to be transmitted to the base station based on at least one specific predetermined time unit, shared by the base station and the terminal; and
reporting the reporting information calculated by the calculating to the base station,
wherein the carrier aggregation is provided by a first cell that uses a first predetermined time unit and a second cell that uses a second predetermined time unit of which a time interval of the second predetermined time unit is less than a time interval of the first predetermined time unit,
wherein multiple second predetermined time units of the second cell correspond to the first predetermined time unit, and
wherein the at least one specific predetermined time unit is at least one of the multiple second predetermined time units.

9. A communication control method in a mobile communication system including a base station and a terminal that supports carrier aggregation, the communication control method comprising:
calculating, by the terminal, reporting information to be transmitted to the base station based on at least one specific predetermined time unit shared by the base station and the terminal;
reporting, by the terminal, the reporting information calculated by the calculating to the base station; and
performing, by the base station, an uplink scheduling process by using the reported reporting information,
wherein the carrier aggregation is provided by a first cell that uses a first predetermined time unit and a second cell that uses a second predetermined time unit of which a time interval of the second predetermined time unit is less than a time interval of the first predetermined time unit,
wherein multiple second predetermined time units of the second cell correspond to the first predetermined time unit, and
wherein the at least one specific predetermined time unit is at least one of the multiple second predetermined time units.

10. The terminal according to claim 2, wherein the reporting information is at least one of a buffer status report, BSR and a power headroom report, PHR.

11. The terminal according to claim 5, wherein the processor selects the specific predetermined time unit based on a power headroom, PH value in the case where the reporting information is the PHR.

* * * * *